United States Patent
Islam et al.

(10) Patent No.: US 12,072,716 B2
(45) Date of Patent: Aug. 27, 2024

(54) METHOD OF CONTROLLING A PLURALITY OF VEHICLES PERFORMING THE SAME MISSION CYCLE

(71) Applicant: VOLVO TRUCK CORPORATION, Gothenburg (SE)

(72) Inventors: Mohammad Manjurul Islam, Gothenburg (SE); David Rylander, Sätila (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 59 days.

(21) Appl. No.: 17/593,586

(22) PCT Filed: Mar. 22, 2019

(86) PCT No.: PCT/EP2019/057318
§ 371 (c)(1),
(2) Date: Sep. 21, 2021

(87) PCT Pub. No.: WO2020/192876
PCT Pub. Date: Oct. 4, 2020

(65) Prior Publication Data
US 2022/0171407 A1    Jun. 2, 2022

(51) Int. Cl.
G05D 1/00       (2024.01)
G06Q 10/0631    (2023.01)
G06Q 50/40      (2024.01)

(52) U.S. Cl.
CPC ......... G05D 1/0293 (2013.01); G05D 1/0214 (2013.01); G06Q 10/06313 (2013.01); G06Q 50/40 (2024.01)

(58) Field of Classification Search
CPC ............... G05D 1/0293; G05D 1/0214; G05D 2201/021; G05D 2201/0212;
(Continued)

(56) References Cited

U.S. PATENT DOCUMENTS

2012/0264092 A1* 10/2012 Ayyagari ............. G09B 5/06
                                                    434/236
2014/0297182 A1* 10/2014 Casson .............. G01C 21/28
                                                    701/537
(Continued)

OTHER PUBLICATIONS

International Search Report and Written Opinion dated Nov. 22, 2019 in corresponding International PCT Application No. PCT/EP2019/057318, 10 pages.
(Continued)

*Primary Examiner* — Isaac G Smith
*Assistant Examiner* — Nikki Marie M Molina
(74) *Attorney, Agent, or Firm* — Venable LLP; Jeffri A. Kaminski

(57) ABSTRACT

The invention relates to a method of controlling a plurality of vehicles, performing the same mission cycle, comprising mapping a first set of planned degrees of progress (CCP1) to the cycle, controlling the vehicles to start the cycle at respective different points in time, determining deviations of the vehicles from a respective planned degree of progress (CCP1i) of the first set of planned degrees of progress (CCP1), mapping, based on the determined deviations, a second set of planned degrees of progress (CCP2) to the cycle, and controlling the vehicles so as to minimize deviations of the vehicles from a respective planned degree of progress (CCP2i) of the second set of planned degrees of progress (CCP2).

16 Claims, 5 Drawing Sheets

(58) Field of Classification Search
CPC .. G06Q 10/06313; G06Q 50/30; G06Q 50/02; G08G 1/127
See application file for complete search history.

(56) References Cited

U.S. PATENT DOCUMENTS

| | | | |
|---|---|---|---|
| 2015/0084787 A1* | 3/2015 | Jericho | G07C 5/0825 |
| | | | 340/870.07 |
| 2017/0083844 A1* | 3/2017 | Baker | H04W 4/70 |
| 2018/0178376 A1* | 6/2018 | Lalonde | B25J 9/1651 |

OTHER PUBLICATIONS

International Preliminary Report on Patentability dated Sep. 21, 2020 in corresponding International PCT Application No. PCT/EP2019/057318, 9 pages.
European Patent Office Communication under Rule 71(3) EPC dated Sep. 6, 2023 in corresponding European Application No. 19 714 358.9-1205, 29 pages.

* cited by examiner

METHOD OF CONTROLLING A PLURALITY OF VEHICLES PERFORMING THE SAME MISSION CYCLE

CROSS-REFERENCE TO RELATED APPLICATIONS

This application is a U.S. National Stage application of PCT/EP2019/057318, filed Mar. 22, 2019, and published on Oct. 1, 2020, as WO 2020/192876 A1, all of which is hereby incorporated by reference in its entirety.

TECHNICAL FIELD

The invention relates to a method of controlling a plurality of vehicles, performing the same mission cycle. The invention also relates to a computer program, a computer readable medium, and a control unit.

The invention can be applied in heavy-duty vehicles, such as mining trucks, road trucks, and buses. Although the invention will be described with respect to mining trucks, the invention is not restricted to this particular vehicle type, but may also be used in other types of vehicles such as cars.

BACKGROUND

Known strategies for vehicle fleets, performing a planned mission, in confined and/or public environments, may involve planning a sequence of vehicle states, and, during execution of the mission, repeatedly establishing the state of each vehicle in the fleet. Diversions from the vehicle fleet mission plane may result in an uneven vehicle distribution, in turn causing queuing at bottleneck areas, etc. This in turn may decrease the productivity achieved by the vehicle fleet.

US2018178376 discusses modifying rates of progresses of robots to avoid collisions. More specifically, the document discloses an expected timeline for each robot, and determining a difference between the rate of progress of a first robot and the rate of progress of a second robot, and modifying a time-parameterized path of the first robot based on the determined difference.

There is nevertheless a desire to allow a further increase of productivity achieved by vehicle fleets.

SUMMARY

An object of the invention is to allow an increase of productivity by a plurality of vehicles, performing the same mission cycle.

The object is reached with a method according to claim 1. Hence the object is reached with a method of controlling a plurality of vehicles, performing the same mission cycle, comprising

- mapping a first set of planned degrees of progress to the cycle,
- controlling the vehicles to start the cycle at respective different points in time,
- determining deviations of the vehicles from a respective planned degree of progress of the first set of planned degrees of progress,
- mapping, based on the determined deviations, a second set of planned degrees of progress to the cycle, and
- controlling the vehicles so as to minimize deviations of the vehicles from a respective planned degree of progress of the second set of planned degrees of progress.

It is understood that all vehicles may perform the same mission cycle. Each vehicle may follow the same lists of activates with the same speed profile in the cycle. The only difference may be the start time of the sequences in the cycle for each vehicle. The mission cycle may take place using a known route or road. The mission cycle may be of a variety of types, e.g. for mining, or for a bus route. The control of the vehicles may be autonomous. Thereby, a central control unit may issue commands to control devices in each of the vehicles. However, the control of the vehicles may alternatively be performed by drivers of the vehicles. Thereby, a central control unit may issue commands that are communicated to the drivers, e.g. by displays and/or by audio devices.

Determining deviations of the vehicles from the respective planned degree of progress of the first set of planned degrees of progress, may be done after the vehicles have been allowed or controlled to start the cycle. Determining deviations of the vehicles from the respective planned degree of progress of the first set of planned degrees of progress, may involve determining actual degrees of progress for the vehicles and comparing the actual degrees of progress with the respective planned degree of progress of the first set of planned degrees of progress.

Controlling the vehicles so as to minimize deviations of the vehicles from a respective planned degree of progress of the second set of planned degrees of progress, may comprise minimizing differences between the actual degrees of progress and respective planned degrees of progress from the second set of planned degrees of progress.

A planned degree of progress of the first set of planned degrees of progress, is herein also referred to as a first planned degree of progress. A planned degree of progress of the second set of planned degrees of progress, is herein also referred to as a second planned degree of progress.

Thus, the invention provides for, rather than controlling the vehicles to minimize deviations of the vehicles from the respective first planned degree of progress, controlling the vehicles so as to minimize deviations of the vehicles from the respective second planned degree of progress.

This allows for increasing the productivity if the second set of planned degrees of progress represent a faster progress than the first set of planned degrees of progress.

More specifically, if the deviations of the vehicles, from the respective first planned degree of progress, indicates that the vehicles are on average ahead of the first planned degrees of progress, and the second planned degrees of progress are mapped to the cycle, based on the determined deviations, the second planned degrees of progress may represent faster progresses that the first planned degrees of progress. I.e. advantage may be taken of the fact that the vehicles are on average ahead of the first planned degrees of progress, to create the updated, faster, second planned degrees of progress. Thereby, unnecessary slowing down of vehicles may be avoided. This allows for increasing the productivity of the vehicle fleet.

Preferably, the step of controlling the vehicles so as to minimize deviations, of the vehicles from a respective planned degree of progress of the second set of planned degrees of progress, is done on the condition that the second set of planned degrees of progress represent a faster progress than the first set of planned degrees of progress. Thereby, it may be secured that the control with the second planned degrees of progress provides for an increase of the productivity of the vehicle fleet.

Preferably, the method comprises dividing the cycle into stages with respective vehicle activities, wherein mapping the first set of planned degrees of progress to the cycle comprises mapping the first set of planned degrees of progress to the cycle stages. Thereby, determining deviations of the vehicles, from a respective planned degree of progress, may comprise determining the stages in which the vehicles are in. The stages may be activities including in the mission, such as loading, moving between two positions, unloading, etc. Determining said deviations may also comprise determining the degree of completion of the respective vehicle of the respective stage. Thereby, an accurate status of the vehicles may be obtained for the deviation determination.

Preferably, mapping the first set of planned degrees of progress to the cycle comprises mapping the first set of planned degrees of progress to the time from the start of the cycle by the respective vehicle. Thereby, a linear relationship between the respective planned degree of progress, and time, may be provided. This makes it easy to compare the actual degree of progress with the planned degree of progress.

Preferably, mapping a first set of planned degrees of progress to the cycle comprises mapping a plurality of first values, of a progress degree parameter, to the cycle. Mapping a plurality of first values to the cycle, may involve mapping an infinite amount of first values to the cycle.

Mapping a plurality of first values to the cycle, may involve mapping the first values to the time from the start of the cycle by the respective vehicle. The progress degree parameter may be a cycle completion percentage. Thereby, a one dimensional entity is provided, which may easily be used for determining the deviation of the vehicles from the respective planned degrees of progress. The parameter allows for measuring, in a simple way, the current status of the respective vehicle, e.g. in terms of the completion of the list of activities of the mission, for example, loading percentage completed, distance traveled, etc.

Preferably, determining deviations of the vehicles from the respective planned degree of progress comprises, for each vehicle, comparing an actual value of the progress degree parameter to a respective first progress degree parameter value. Thereby, the actual value of the progress degree parameter may be compared to a respective planned degree of progress. Thereby, the deviation from the first planned degree of progress may be easily established, and quantified. In some embodiments, the respective time from start of the respective vehicle gives a respective first value.

Preferably, determining deviations of the vehicles from the first planned degree of progress comprises, for each vehicle, calculating a progress degree difference as a difference between the actual progress degree parameter value and the respective first progress degree parameter value. Thereby, an advancement indicator may be determined based on the progress degree difference for the respective vehicle. In some embodiments, the advancement indicator may be the progress degree difference. In some embodiments, the advancement indicator may be calculated based on the progress degree difference and the respective time since start for the respective vehicle. For example, the advancement indicator may be calculated as a ratio between the progress degree difference and the respective time since start for the respective vehicle.

Thereby, use is made of the progress degree parameter as a normalized index, to provide an easily quantified expression for the deviation. The advancement indicator measures whether, and how much, the respective vehicle is advanced or delayed from the planned degree of progress. More specifically, the sign, positive or negative, of the advancement indicator may tell whether the respective vehicle is advanced or delayed. Further, the size of the advancement indicator measures how much the respective vehicle is advanced or delayed.

Preferably, mapping, based on the determined deviations, a second set of planned degrees of progress to the cycle, comprises calculating an average value of the advancement indicators of the vehicles. Mapping, based on the determined deviations, the second set of planned degrees of progress to the cycle, may further comprise mapping a plurality of, e.g. an infinite amount of, second progress degree parameter values, to the cycle. Thereby, the second progress degree parameter values may differ from the first progress degree parameter values, by a constant value. Said constant value may be equal to the average advancement indicator value. Alternatively, the time derivate, of the second progress degree parameter values, may differ from the time derivate, of the first progress degree parameter values. Thereby, said time derivate difference may be equal to the average advancement indicator value.

Thus, the average advancement indicator value may be used to establish second progress degree parameter values. Further, all vehicles may be controlled towards an average value of deviations from a planned degree of progress. Thus, as also suggested above, rather than controlling the vehicles to return to the originally planned degree of progress, the vehicles are controlled to all present the advancement indicator average value. If the latter indicates that on average the vehicles are in advance of the originally planned degree of progress, the productivity can be increased, since unnecessary slowing down of vehicles is avoided. Also, by replacing, or updating, the planned degrees of progress, based on the average deviation, a uniform deviation may be accomplished.

Preferably, the step of controlling the vehicles so as to minimize deviations, of the vehicles from a respective planned degree of progress of the second set of planned degrees of progress, is done on the condition that the average advancement indicator value indicates an average progress of the vehicles that is faster than the first set of planned degrees of progress. Thereby, it may be secured that the change of the planned degrees of progress will result in faster progress. Hence the increase in productivity may be secured.

It should be noted that the steps of embodiments of the method according to the invention, may be repeated while the vehicles are performing the mission. Such repetitions may be performed at predetermined time intervals. In some embodiments, the method may be repeated continuously.

The objects are also reached with a computer program, a computer readable medium, a control unit or a group of control units.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
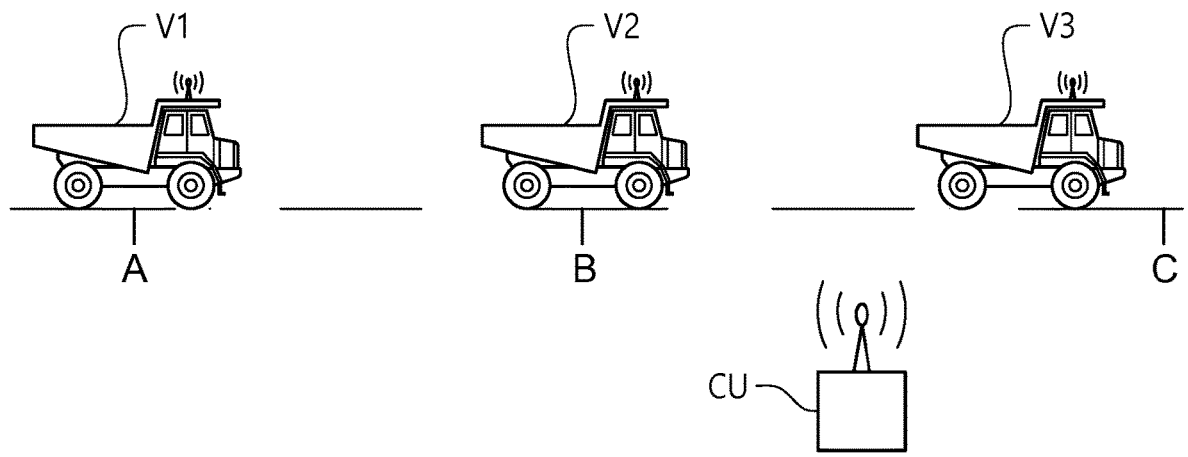
FIG. 1 shows schematically a route travelled by three vehicles performing a mission.

FIG. 1 depicts three heavy-duty vehicles V1, V2, V3 in the form of mining trucks. The vehicles are referred to as a first vehicle V1, a second vehicle V2, and a third vehicle V3. The group of vehicles V1-V3 are herein also referred to as a fleet of vehicles. It should be noted that embodiments of the invention is applicable to vehicle fleets with any number of vehicles.

In this example, the vehicles perform the same mission cycle in a mine. However, the invention is applicable to a variety of vehicle missions. Further, the vehicles may be of any type suitable for the particular mission. For example, the vehicles may be road trucks, delivery vans, buses, or cars.

The mission involves driving on a route, from a start position A to an end position C, via an intermediate positon B. The environment is in this example a mine, but the route could be in any type of environment, such as in a construction site, along an urban road, and/or along a rural road. In this example, the mission involes loading at position A, passing a gate at position B, and unloading at position C. In general, the route could include any number of positions for respective specified activities. The activities could be of any suitable alternative type, for example delivery or pick-up of goods or people, or fuelling and/or charging of batteries of the vehicles.

In this example, the vehicles V1-V3 return to position A after having completed the activity at position C. Thus, the mission could be referred to as a circulating mission. In alternative embodiments, the mission could, as opposed to be circulating, extend from a start position and terminate at an end position at a location which is different from that of the start position.

A control unit CU is arranged to carry out steps of an embodiment of a method according to the invention. The control unit could be a part of a control center for controlling the vehicles V1-V3. The control unit CU is arranged to communicate wirelessly with each of the vehicles V1-V3.

The control unit CU may be arranged to receive information from the vehicles, e.g. regarding their positions, and speeds. The control unit may also be arranged to send control commands to the vehicles. In some embodiments, the vehicles are driverless, and control devices (not shown) in the vehicles, which are arranged to control operational devices of the vehicles, such as engines, motors, brakes and steering, may be arranged to read the control commands from the control unit CU. In other embodiments, the vehicles may be arranged to display control commands from the control unit CU, to drivers of the vehicles.

In some embodiments, the control unit CU could be located on one of the vehicles, or parts of the control unit CU could be distributed on a plurality of the vehicles.

It is understood that the control unit CU comprises a computer. It is further understood that the control unit CU may be arranged to carry out an embodiment of the method according to the invention, by means of a computer program.

Figure 2:
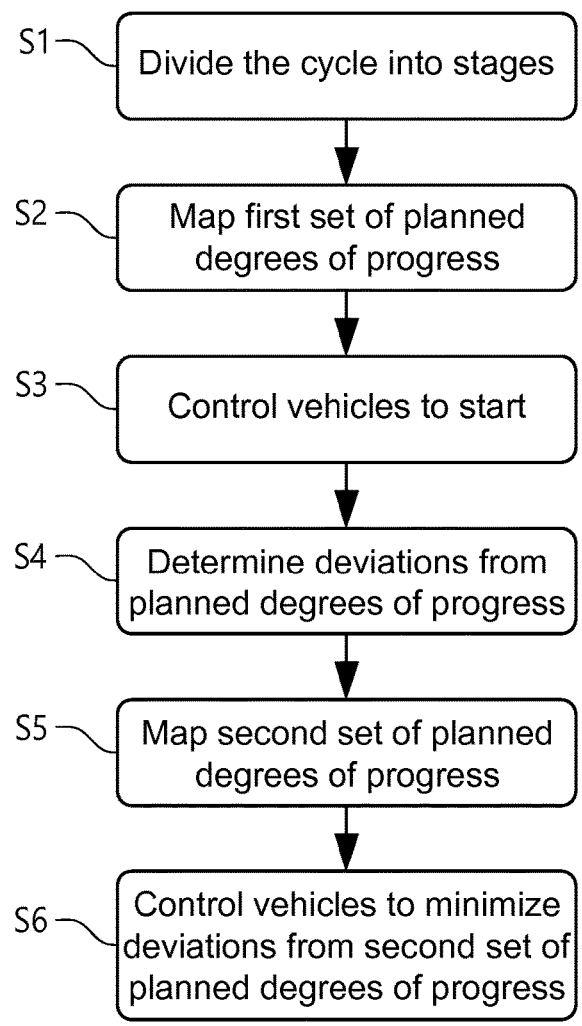
FIG. 2 is a diagram depicting steps in a method according to an embodiment of the invention.

With reference to FIG. 2, a method of controlling the vehicles will be described.

Figure 3:
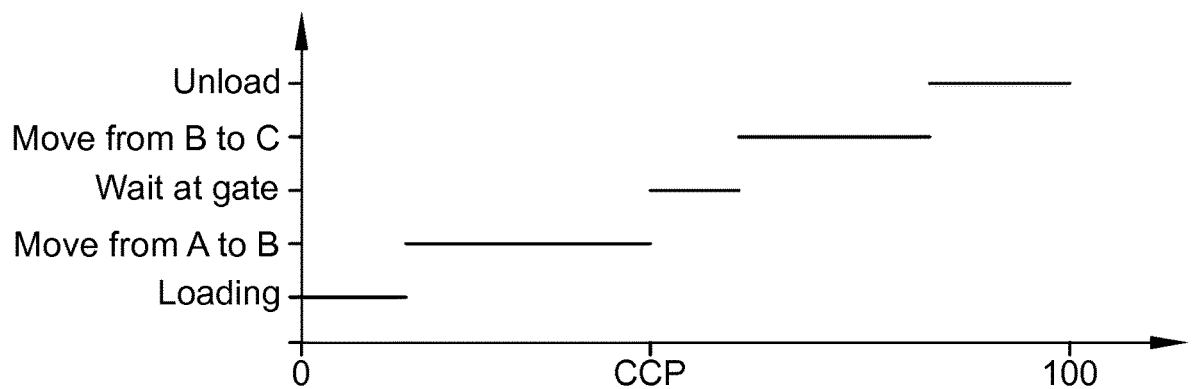
FIG. 3 is a diagram showing how stages of the mission are mapped to a planned degree of progress.

Reference is made also to FIG. 3. The method comprises dividing S1 the cycle into stages with respective vehicle activities. In this example, the stages include those listed along the vertical axis in FIG. 3, i.e. loading at position A, moving from position A to position B, waiting at the gate in position B, moving from position B to position C, and unloading at position C. Further stages not shown in FIG. 3 are moving from position C to position B, waiting at the gate in position B, and moving from position B to position A. However, for simplicity of this presentation, the cycle is regarded as 100% complete, once the stage of unloading at the position C is completed.

The method further comprises mapping S2, for each vehicle V1-V3, a first planned degree of progress to the cycle stages. The first planned degrees of progress of the vehicles are herein collectively referred to as a first set of planned degrees of progress. In this example, the first planned degrees of progress are the same for all vehicles. Mapping the first set of planned degrees of progress to the cycle comprises in this example mapping first values, of a progress degree parameter CCP, to the cycle. The progress degree parameter CCP is indicated along the horizontal axis in FIG. 3. The progress degree parameter is a measure of the percentage of completion of the cycle.

Figure 4:
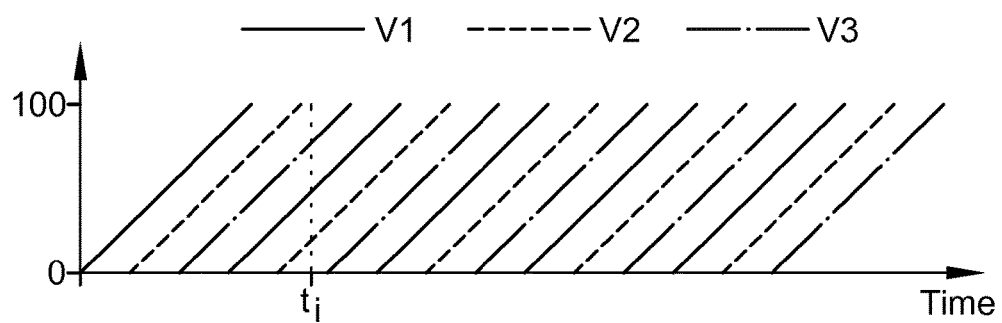
FIG. 4 is a diagram showing how the planned degrees of progress for the vehicles in FIG. 1 are mapped to time.

Reference is also made to FIG. 4. In this example, the first values of the progress degree parameter CCP are mapped to the cycle, so as to be linearly related to the time from the start of the cycle by the respective vehicle. Thereby, mapping the first values of the progress degree parameter to the cycle, may include estimating the duration of each stage.

For example, loading at position A may be estimated to take 2 minutes and 42 seconds. Estimating the duration for moving from position A to position B may involve estimating a speed profile of the respective vehicle along that part of the route. Based on the speed profile, the duration can be determined. Waiting at the gate at position B may be estimated to take 20 seconds. The duration for moving from position B to position C may be determined based on an estimated speed profile, in the manner suggested for moving from position A to position B. Unloading at position C may be estimated to take 2 minutes and 53 seconds.

Thereafter, the total estimated duration for the cycle may be linearly adapted to the progress degree parameter so that the time from start to completion of the cycle matches values of the progress degree parameter from 0 to 100%.

The method involves controlling the vehicles in S3 to start the cycle at respective different points in time. Preferably, there is a constant time interval between all pairs of subsequent starts. The vehicles are started.

When all vehicles have started, deviations of the vehicles, from the respective first planned degree of progress, are determined in S4. Such a determination may be made at a predetermined time interval after the last vehicle start. Thereby, the status of each vehicle is determined.

Determining the status of a vehicle may involve determining the stage in which the vehicle is in. The status determination may further involve determining the degree of completion of the stage in which the vehicle is in. Such a degree of completion could be e.g. a loading percentage completed, a distance traveled etc. The stages, and the degrees of completion of the stages, that the vehicles are in, may be identified by suitable devices, such as GPS (Global Positioning System) devices, sensors, and cameras. Such devices may be placed in the vehicles, and/or along the route. Information from the devices may be communicated to the control unit CU.

Based on the status of the respective vehicle, an actual value of the progress degree parameter CCP is determined. This may be done using the diagram in FIG. 3. The stage that the vehicle is in, and the degree of completion of the stage, will provide an actual value of the progress degree parameter CCP.

Further, the planned degree of progress CCP is determined. This may be done based on the time which has elapsed since the start of the respective vehicle. This may be also be done using the diagram in FIG. 4.

Figure 5:
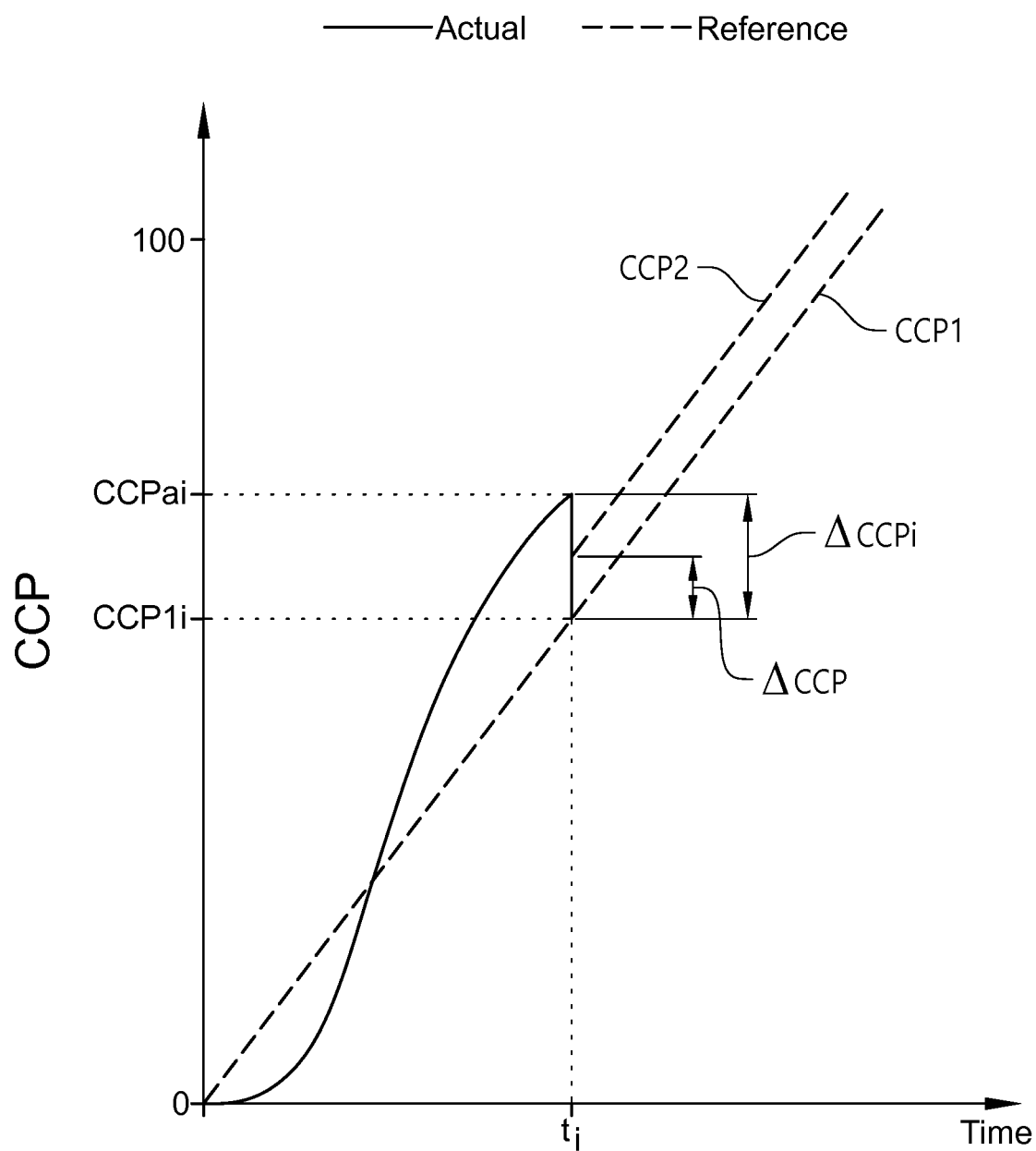
FIG. 5 is a diagram showing parameters used for changing the planned degree of progress for the vehicles in FIG. 1.

Reference is made also to FIG. 5. Determining the deviations of the vehicles, from the respective planned degree of progress, comprises, for each vehicle, comparing the actual value CCPai of the progress degree parameter to the respective planned degree of progress CCP1i. This involves calculating a progress degree difference ΔCCPi as a difference between the actual progress degree parameter value CCPai and the respective planned progress degree parameter value CCP1i.

An advancement indicator is determined to be the progress degree difference ΔCCPi. In some embodiments, the advancement indicator is calculated as a ratio $\lambda_i$ between the progress degree difference ΔCCPi and the respective time ti since start for the respective vehicle. It should be noted that in this example, if the respective vehicle is ahead of the planned degree of progress CCP1i, the progress degree difference ΔCCPi, and hence the advancement indicator $\lambda_i$, is positive. If the respective vehicle is behind the planned degree of progress CCP1i, the progress degree difference ΔCCPi, and hence the advancement indicator $\Delta_i$, is negative.

Figure 6:
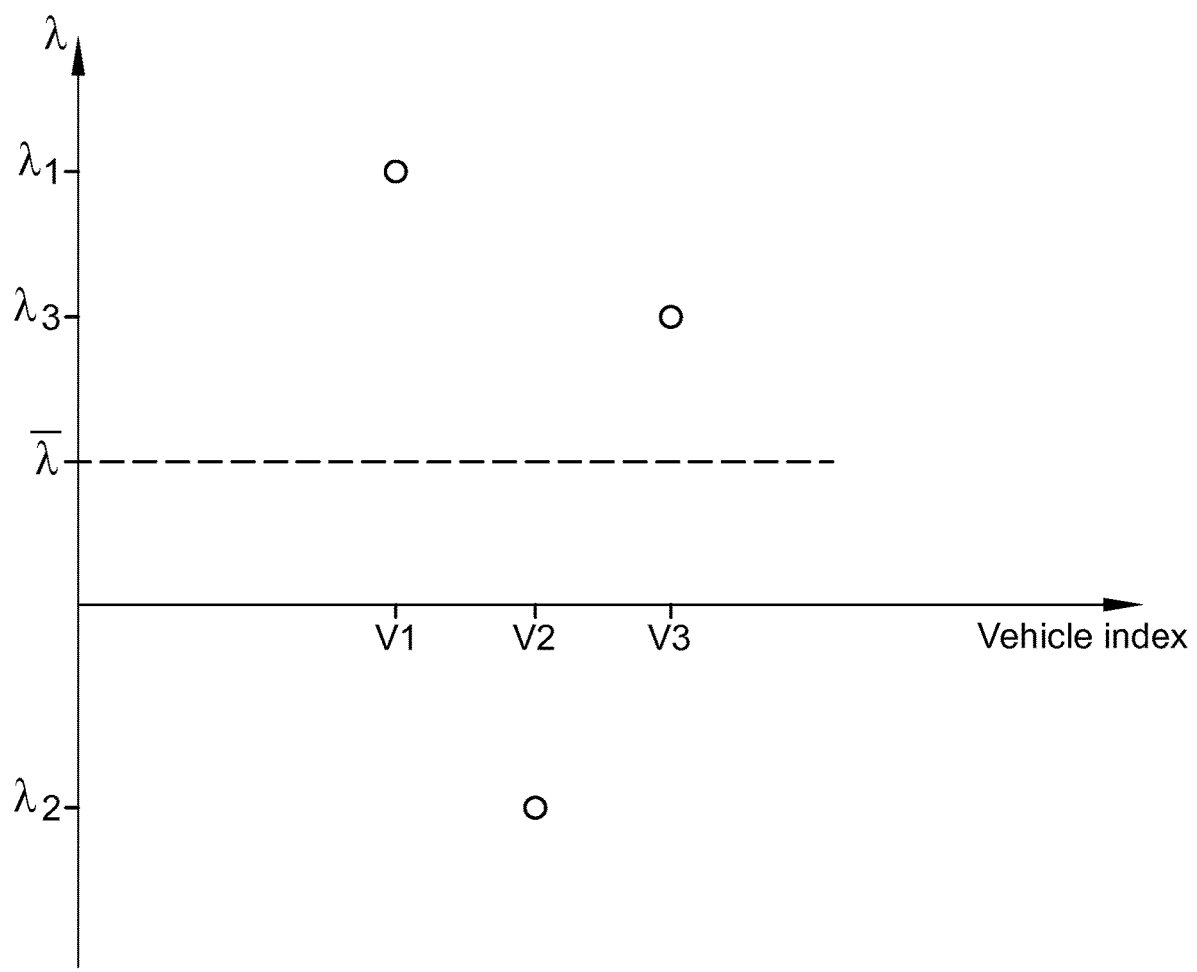
FIG. 6 is a diagram showing advancement indicators for the vehicles in FIG. 1.

Reference is made also to FIG. 6. In this example, the first and third vehicles V1, V3 are early, i.e. ahead of the planned degree of progress CCP11, CCP13. The second vehicle V2 is behind the planned degree of progress CCP12.

An average value $\bar{\lambda}$ of the advancement indicators $\lambda_i$ of the vehicles is calculated. In this example, this average value is calculated as:

$$\bar{\lambda} = \frac{\lambda_1|\lambda_2|\lambda_3}{3}$$

For $_i$th vehicle, a relative advancement indicator, denoted by $\sigma_i$, with respect to the vehicle fleet, may be determined as:

$$\sigma_i = \lambda_i - \bar{\lambda}$$

Further steps of the method are dependent on whether a second set of planned degrees of progress represent a faster progress than the first set of planned degrees of progress. As explained below said second set is determined based on the average advancement indicator value $\bar{\lambda}$. If the average advancement indicator value $\bar{\lambda}$ is positive, the average progress of the vehicles V1-V3 is faster than the first set of planned degrees of progress. If the average advancement indicator value $\bar{\lambda}$ is negative, the average progress of the vehicles V1-V3 is slower than the first set of planned degrees of progress.

If the average advancement indicator value $\bar{\lambda}$ is negative, the vehicles are controlled so as to minimize deviations of the vehicles from the respective planned degree of progress CCP1i of the first set of planned degrees of progress CCP1.

However, if the average advancement indicator value $\bar{\lambda}$ is positive, the vehicles are controlled so as to minimize deviations of the vehicles from the respective planned degree of progress CCP2i of the second set of planned degrees of progress CCP2.

Reference is made again to FIG. 5. Based on the determined deviations, second progress degree parameter values CCP2 are mapped S5 to the cycle. The second progress degree parameter values CCP2 are determined as having the same rate of change as the first progress degree parameter values CCP1, but as having a constant higher value ΔCCP. In this example, the difference ΔCCP between the second progress degree parameter values CCP2 and the first progress degree parameter values CCP1 is equal to the average advancement indicator value $\bar{\lambda}$.

Figure 7:
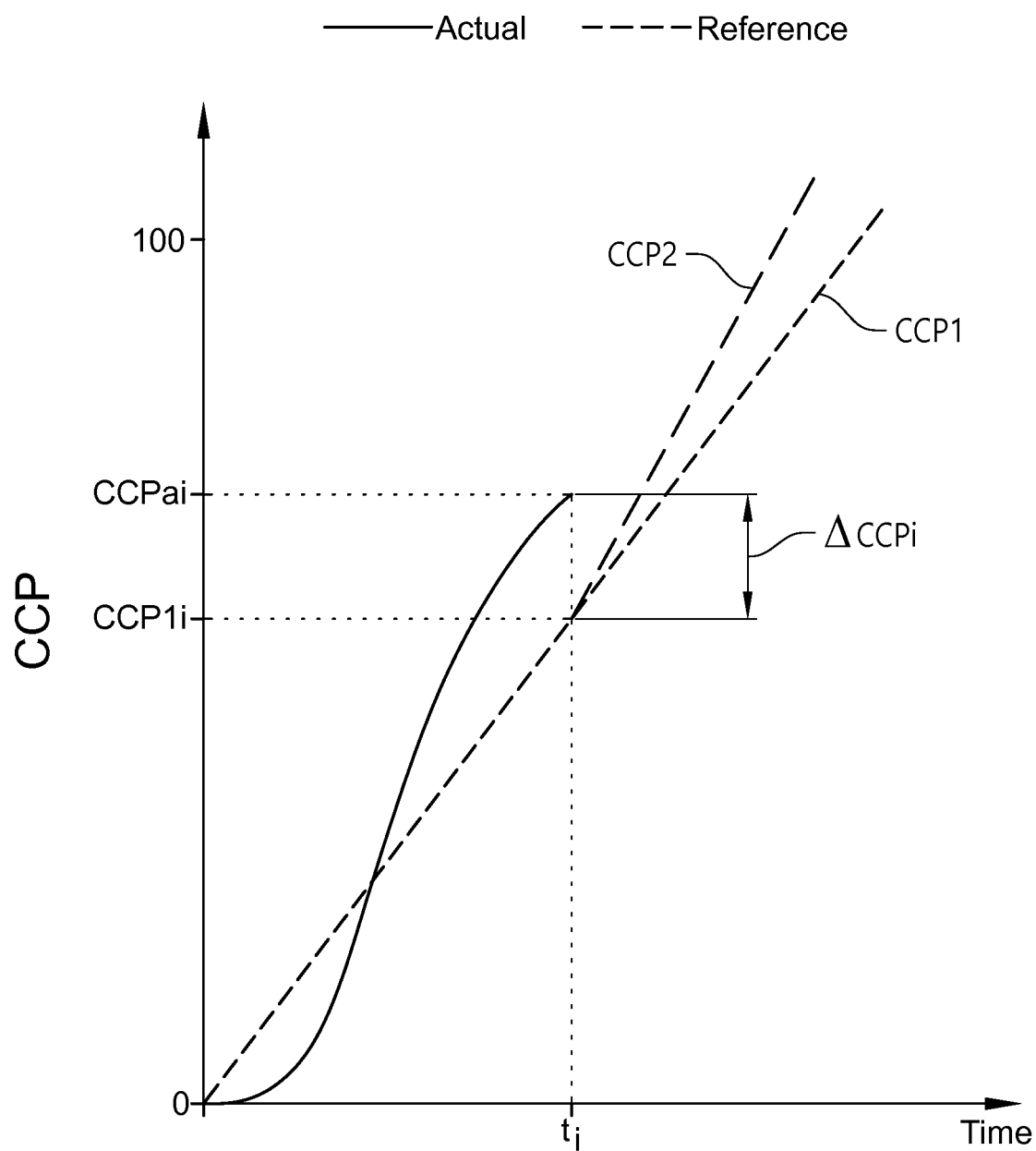
FIG. 7 is a diagram showing parameters used for changing the planned degree of progress for the vehicles according to an alternative embodiment.

Reference is made to FIG. 7. In alternative embodiments, the time derivate dCCP2/dt, of the second progress degree parameter values, differs from the time derivate dCCP1/dt, of the first progress degree parameter values. Said difference may be equal to the average advancement indicator value $\bar{\lambda}$.

It is to be understood that the present invention is not limited to the embodiments described above and illustrated in the drawings; rather, the skilled person will recognize that many changes and modifications may be made within the scope of the appended claims.

The invention claimed is:

1. A method of controlling a plurality of vehicles, the method comprising:
    mapping the plurality of vehicles to perform a same predetermined mission cycle including same tasks along a same route;
    dividing the predetermined mission cycle into a plurality of stages with respective vehicle activities;
    estimating a time duration for each of the stages;
    associating the time duration for each of the stages with a planned degree of progress for the predetermined mission cycle, wherein the planned degree of progress is a measure of a percentage of completion of the predetermined mission cycle;
    mapping a first set of planned degrees of progress for the plurality of vehicles to the predetermined mission cycle,
    controlling the plurality of vehicles to start the predetermined mission cycle at respective different points in time,
    determining deviations of the vehicles from a respective planned degree of progress of the first set of planned degrees of progress,
    mapping, based on the determined deviations, a second set of planned degrees of progress to the predetermined mission cycle, and
    controlling the plurality of vehicles so as to minimize deviations of the plurality of vehicles from a respective planned degree of progress of the second set of planned degrees of progress based on the condition that the second set of planned degrees of progress represent a faster progress than the first set of planned degrees of progress.

2. A method according to claim 1, characterized in that determining deviations of the vehicles, from a respective planned degree of progress, comprises determining the stages in which the vehicles are in.

3. A method according to claim 1, characterized in that mapping the first set of planned degrees of progress to the cycle comprises mapping the first set of planned degrees of progress to the time from the start of the cycle by the respective vehicle.

4. A method according to claim 1, characterized in that mapping a first set of planned degrees of progress to the cycle comprises mapping a plurality of first values, of a progress degree parameter, to the cycle.

5. A method according to claim 4, characterized in that determining deviations of the vehicles from the respective planned degree of progress comprises, for each vehicle, comparing an actual value of the progress degree parameter to a respective first progress degree parameter value.

6. A method according to claim 4, characterized in that determining deviations of the vehicles from the first planned degree of progress comprises, for each vehicle, calculating a progress degree difference as a difference between the actual progress degree parameter value and the respective first progress degree parameter value.

7. A method according to claim 6, characterized by determining an advancement indicator based on the progress degree difference for the respective vehicle.

8. A method according to claim 7, characterized in that mapping, based on the determined deviations, a second set of planned degrees of progress to the cycle, comprises calculating an average value of the advancement indicators of the vehicles.

9. A method according to claim 4, characterized in that mapping, based on the determined deviations, a second set of planned degrees of progress to the cycle, further comprises mapping a plurality of second progress degree parameter values, to the cycle.

10. A method according to claim 9, characterized in that the second progress degree parameter values differ from the first progress degree parameter values, by a constant value.

11. A method according to claim 10, characterized in that said constant value is equal to the average advancement indicator value.

12. A method according to claim 9, characterized in that the time derivate, of the second progress degree parameter values, differs from the time derivate, of the first progress degree parameter values.

13. A method according to claim 8, characterized in that time derivate difference is equal to the average advancement indicator value.

14. A method according to claim 8, characterized in that the step of controlling the vehicles so as to minimize deviations, of the vehicles from a respective planned degree of progress of the second set of planned degrees of progress, is done on the condition that the average advancement indicator value indicates an average progress of the vehicles that is faster than the first set of planned degrees of progress.

15. A non-transitory computer readable medium carrying a computer program comprising program code for performing the steps of claim 1 when said program code is run on a computer, or a group of computers.

16. A control unit, or a group of control units, configured to perform the steps of the method according to claim 1.

* * * * *